(12) United States Patent
Prakash

(10) Patent No.: US 12,092,723 B2
(45) Date of Patent: Sep. 17, 2024

(54) TARGET-VELOCITY ESTIMATION USING POSITION VARIANCE

(71) Applicant: Aptiv Technologies AG, Schaffhausen (CH)

(72) Inventor: Niket Prakash, Rochester Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 384 days.

(21) Appl. No.: 17/503,218

(22) Filed: Oct. 15, 2021

(65) Prior Publication Data

US 2023/0121956 A1 Apr. 20, 2023

(51) Int. Cl.
| | | |
|---|---|---|
| *G01S 13/58* | (2006.01) | |
| *G01S 13/52* | (2006.01) | |
| *G01S 13/931* | (2020.01) | |

(52) U.S. Cl.
CPC ............ *G01S 13/58* (2013.01); *G01S 13/931* (2013.01); *G01S 2013/9321* (2013.01); *G01S 2013/93272* (2020.01)

(58) Field of Classification Search
CPC ...... G01S 7/4802; G01S 7/539; G01S 13/726; G01S 15/588; G01S 15/66; G01S 15/931; G01S 17/58; G01S 17/66; G01S 17/931; G01S 2013/9315; G01S 2013/9323; G01S 2013/9324; G01S 13/723; G01S 13/52; G01S 13/588; G01S 13/589; G01S 7/415
USPC ........................................................ 342/104
See application file for complete search history.

(56) References Cited

U.S. PATENT DOCUMENTS

2019/0361106 A1* 11/2019 Stachnik ............... G01S 13/588

FOREIGN PATENT DOCUMENTS

| DE | 102012024998 A1 | 6/2014 |
| EP | 3572839 A1 | 11/2019 |

OTHER PUBLICATIONS

"Extended European Search Report", EP Application No. 22197367. 0, Feb. 15, 2023, 14 pages.

* cited by examiner

*Primary Examiner* — Ladimir Magloire
*Assistant Examiner* — Remash R Guyah
(74) *Attorney, Agent, or Firm* — Harness, Dickey & Pierce, P.L.C.

(57) ABSTRACT

The techniques and systems herein enable target-velocity estimation using position variance. Specifically, a plurality of detections of a target are received for respective times as the target moves relative to a host vehicle. Based on the detections, two-dimensional positions of the target relative to the host vehicle are determined for the respective times. Based on the positions of the target at the respective times, a first variance is determined for a first dimension of the positions, and a second variance is determined for a second dimension of the positions. Based on the first and second variances, an estimated velocity of the target is calculated. By basing the estimated velocity on the variances of the positions, more-accurate estimated velocities may be generated sooner, thus enabling better performance of downstream operations.

20 Claims, 6 Drawing Sheets

TARGET-VELOCITY ESTIMATION USING POSITION VARIANCE

BACKGROUND

Estimating velocities of targets (e.g., direction and speed) is important for many vehicle operations (e.g., blind-spot monitoring, cross-traffic warnings, oncoming-traffic warnings, semi-autonomous driving technologies, autonomous-driving technologies). Determining velocities of targets sooner can provide improved accuracy, efficacy, and safety. When targets are further away, sensors used for velocity estimation may only detect a single-point scatter from the targets and when the targets are near, the sensors may detect multiple-point scatters from the targets. In the case of the single-point scatters, each frame may have a scatter from a different part of the target. This spatial differentiation among the single-point scatters can cause velocity estimations, especially direction estimations, to be inaccurate. For example, when a series of single-point scatters from an approaching target vehicle span different parts of a bumper, spatial differentiation in the single-point point scatters can be misinterpreted as perceived vehicle movement in a direction along the bumper, thereby leading to an inaccurate velocity estimate. Inaccurate velocity estimations can cause decreased functionality of downstream operations, which may adversely impact safety.

SUMMARY

This document is directed to techniques for enabling target-velocity estimation using position variance. Systems and components, including systems comprising means (e.g., processing systems), are described for performing methods in accordance with the techniques described herein. Some aspects described below include a system including at least one processor and/or computer-readable storage media comprising executable instructions configured to cause the system to receive a plurality of detections of a target for respective different times as the target moves relative to a host vehicle. The processor and/or the executable instructions are further configured to cause the system to determine, based on the detections, positions of the target, in two dimensions relative to the host vehicle, at the respective different times. The processor and/or the executable instructions are further configured to cause the system to, based on the positions of the target at the respective different times, determine a first variance for a first of the two dimensions and a second variance for a second of the two dimensions. The processor and/or the executable instructions are further configured to cause the system to calculate an estimated velocity of the target based on the first variance and the second variance to account for different portions of the target causing the respective detections and to output the estimated velocity of the target for receipt by a vehicle component of the host vehicle.

Other aspects described below include a method performed by the above system, another system or component, or a combination thereof. The method includes obtaining a plurality of detections of a target for respective times as the target moves relative to the host vehicle. The method also includes accounting for at least one variance in spatial differences in the detections of the target to calculate an estimated velocity of the target. The method further includes, responsive to accounting for the variance in the spatial differences in the detections of the target to calculate the estimated velocity of the target, outputting the estimated velocity of the target for receipt by a vehicle component of the host vehicle.

Further aspects described below include computer-readable storage media including instructions that, when executed by one or more processors, causes the one or more processors, the above system, another system or component, or any combination thereof to receive a plurality of detections of a target for respective different times as the target moves relative to a host vehicle and to determine, based on the detections, positions of the target, in two dimensions relative to the host vehicle, at the respective different times. The instructions also cause the one or more processors, the above system, the other system or component, or the combination thereof to determine, based on the positions of the target at the respective different times, a first variance for a first of the two dimensions and a second variance for a second of the two dimensions and to calculate an estimated velocity of the target based on the first variance and the second variance to account for different portions of the target causing the respective detections. The instructions further cause the one or more processors, the above system, the other system or component, or the combination thereof to output the estimated velocity of the target for receipt by a vehicle component of the host vehicle.

This Summary introduces simplified concepts for enabling target-velocity estimation using position variance that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Techniques for enabling target-velocity estimation using position variance are described with reference to the following drawings that use some of the same numbers throughout to reference like or examples of like features and components.

DETAILED DESCRIPTION

Overview

Estimating velocities of targets at far distances (e.g., velocity initialization) is an important tool in many vehicle operations. At such distances, however, sensors used for estimating velocities often only receive single-point scatters as detections of the targets. Because locations of detections based on single-point scatters may span various portions of targets, velocity estimations using single-point scatters are often inaccurate. For example, as a target vehicle moves with a particular velocity, a series of sequential single-point scatters may be generated by respective portions of a target vehicle that span a leading edge (e.g., bumper) of the target vehicle. Based on spatial separation in the single-point scatters, a perceived velocity of target vehicle may be inaccurate, or in some cases, have velocity components that are opposite that of the particular velocity. Without accounting for the ambiguity between the spatial separation and the actual target movement, conventional techniques are often unable to produce accurate velocity estimations for single-point scatters (e.g., when targets are at far distances). For example, some conventional techniques assume that the target is either traversing parallel to a host vehicle or radially to the host vehicle. Without a priori information about the situations, such assumptions can lead to grossly misestimated velocities, in both magnitude and direction.

The techniques described herein enable target-velocity estimation using position variance. Specifically, a plurality of detections of a target are received for respective times as the target moves relative to a host vehicle. Based on the detections, two-dimensional positions of the target relative to the host vehicle are determined for the respective times. Based on the positions of the target at the respective times, a first variance is determined for a first dimension of the positions, and a second variance is determined for a second dimension of the positions. Based on the first and second variances, an estimated velocity of the target is calculated. By basing the estimated velocity on the variances of the positions, more-accurate estimated velocities may be generated sooner, thus enabling better performance of downstream operations, which may further lead to driving safety.

Example Environments

Figure 1:
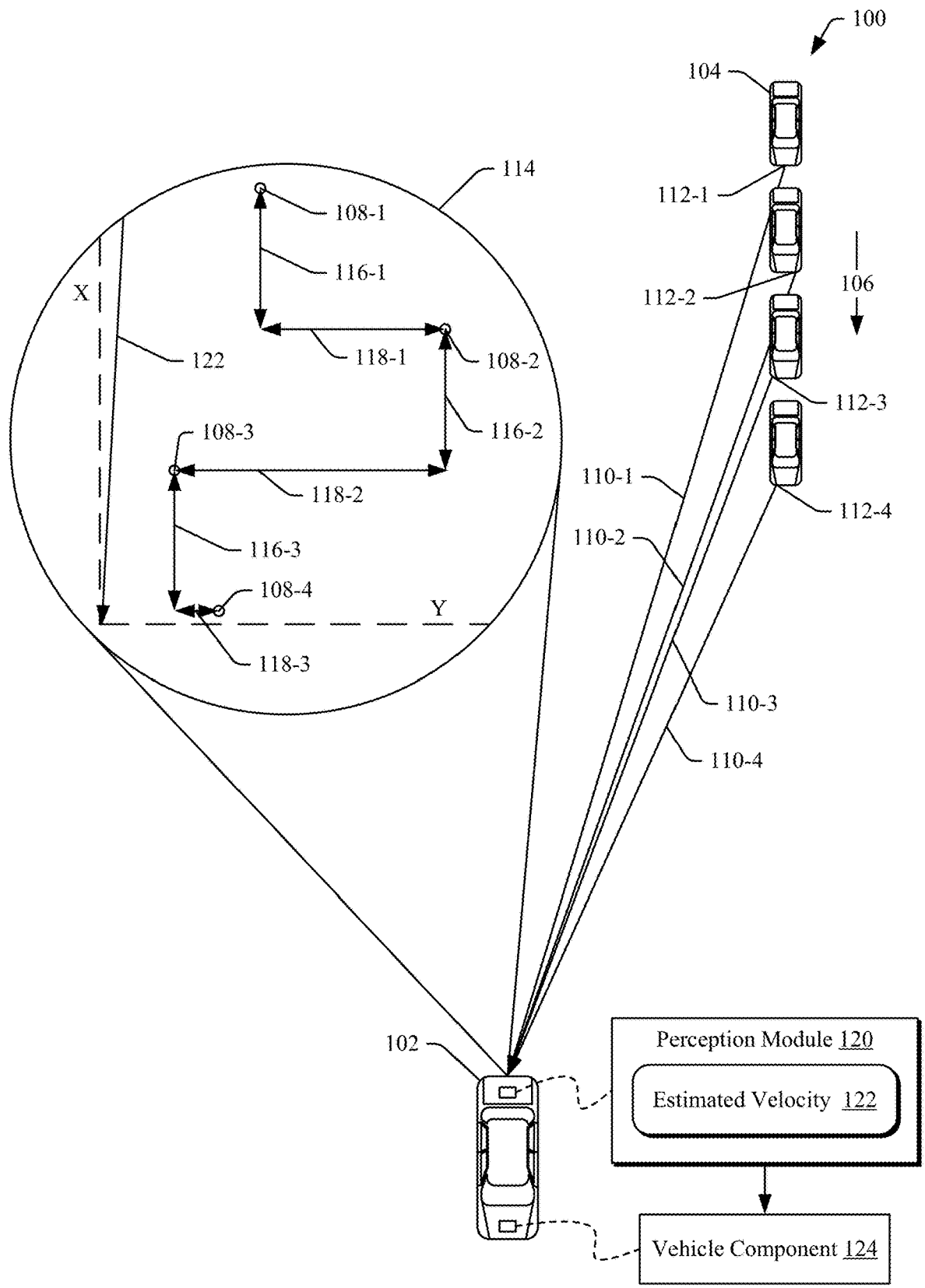
FIGS. 1-3 illustrate example environments where target-velocity estimation using position variance may be used, in accordance with techniques of this disclosure.
Figure 2:
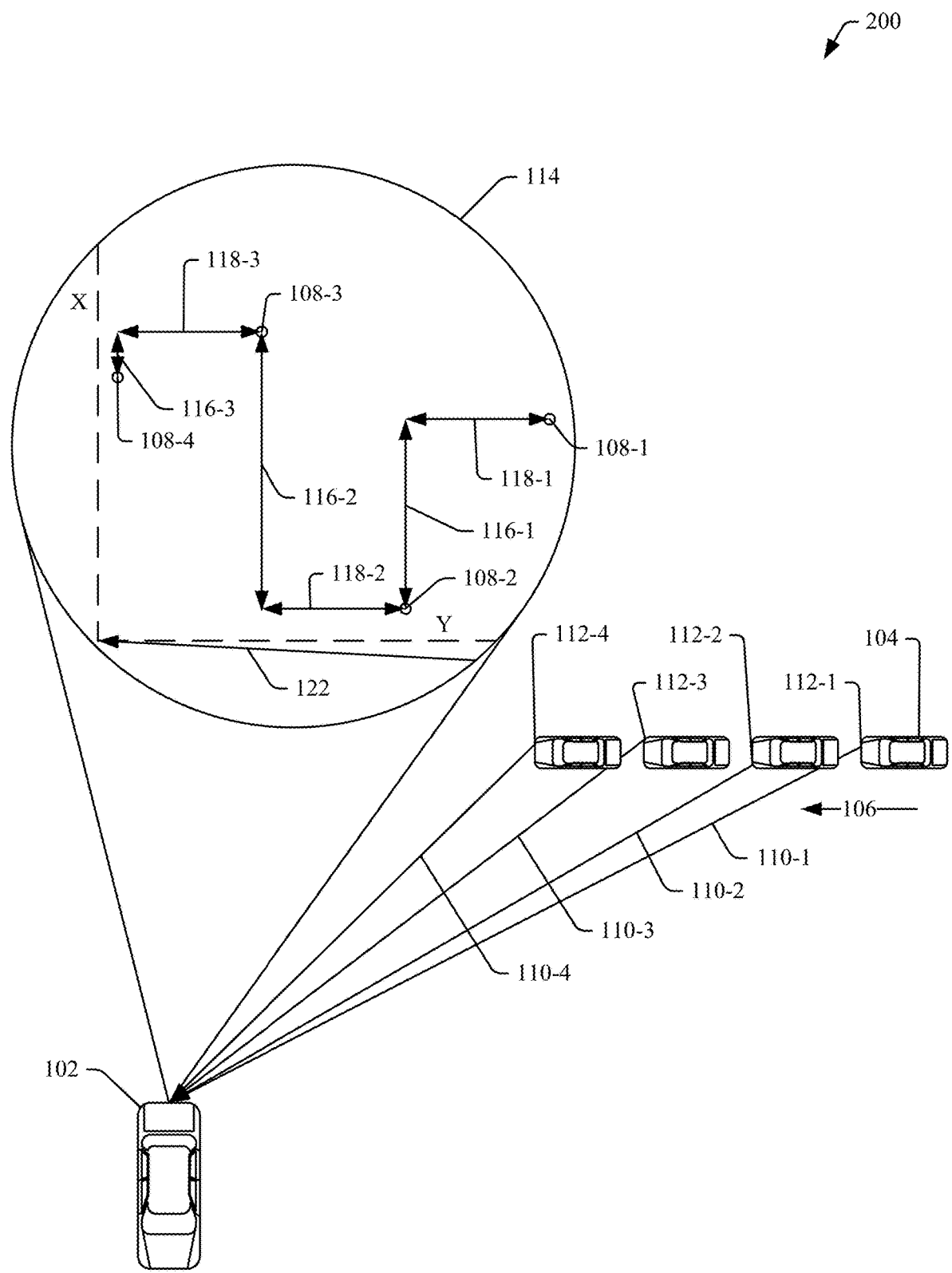
Figure 3:
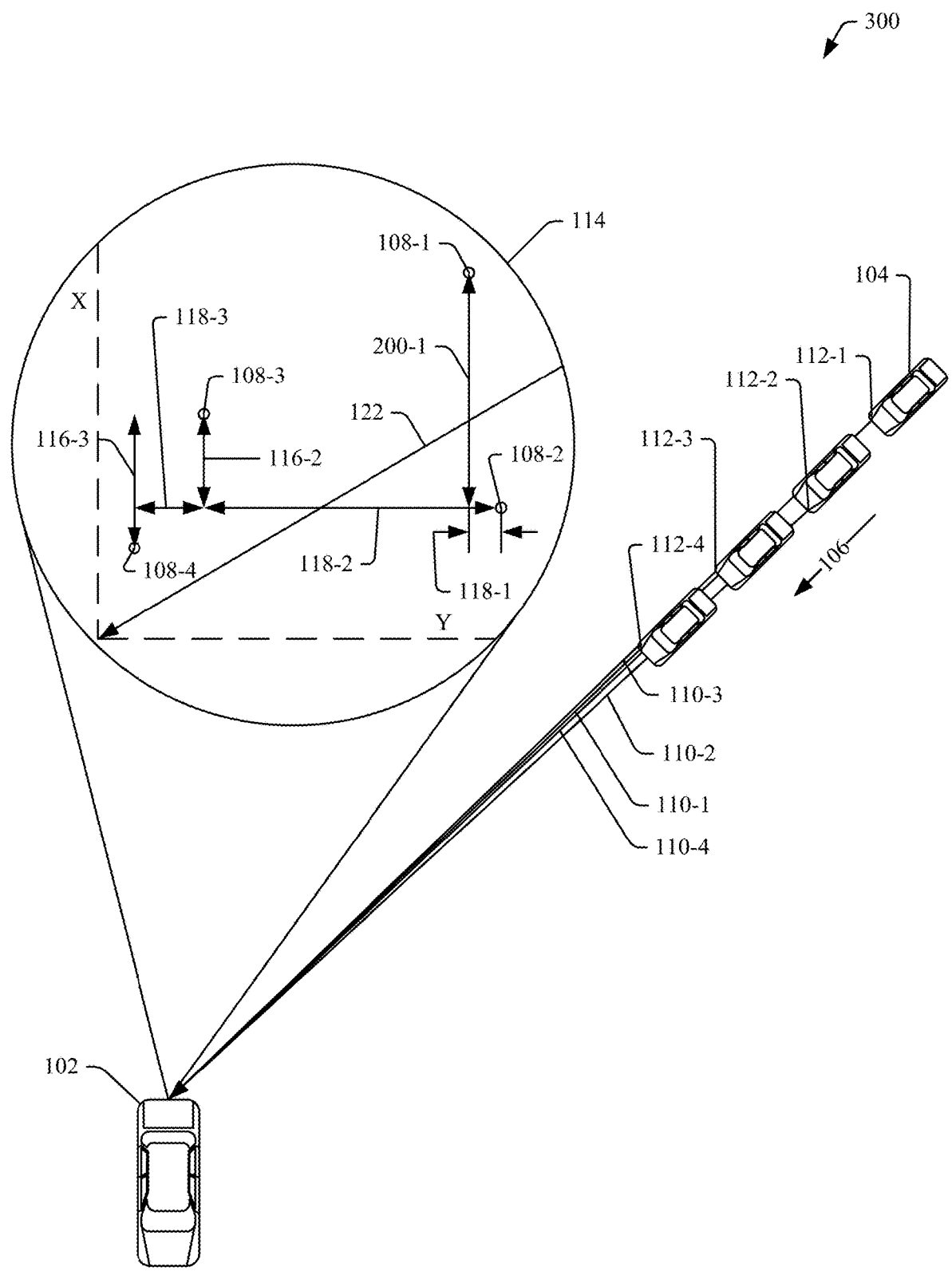

FIGS. 1-3 illustrate example environments 100, 200, and 300, respectively, where target-velocity estimation using position variance may be used. The example environments 100, 200, and 300 contain a host vehicle 102 and a target 104 that is traveling with a velocity 106. In the example environment 100, the velocity 106 is parallel to an orientation of the host vehicle 102. In the example environment 200, the velocity 106 is perpendicular to the orientation of the host vehicle 102. Lastly, in the example environment 300, the velocity 106 is neither parallel nor perpendicular to the orientation of the host vehicle 102. The three environments are shown for illustration and/or comparison purposes only. It should be appreciated that the target 104 may have any velocity 106 relative to the host vehicle 102 without departing from the scope of this disclosure. As provided in the Brief Description of the Drawings, like numbers are used throughout FIGS. 1-3 for simplicity. It should be noted that, while certain aspects may appear the same throughout different situations, certain aspects are different and evident from the relevant description. Subsequent recitations of similar numbers are meant to be other examples of similar aspects and should not be considered as limiting examples.

The host vehicle 102 may be any type of system (automobile, car, truck, motorcycle, e-bike, boat, air vehicle, and so on). The target 104 may be any type of moving or stationary object (automobile, car, truck, motorcycle, e-bike, boat, pedestrian, cyclist, boulder, and so on). Furthermore, the systems described herein may be implemented in other environments such as air-traffic control, infrastructure, traffic assessment and control, fleet control, and defense environments.

The host vehicle 102 uses one or more sensors (not shown) to generate detections 108 corresponding to a plurality of respective times as the target 104 moves with velocity 106. The detections 108 may be generated using any type of sensor such as radar, sonar (e.g., ultrasound), lidar, and so on. When radar is used, the detections 108 may be based on radar returns 110 (e.g., radar scatters) from the target 104 at the respective times. When the target 104 is at a sufficient distance from the host vehicle 102, the target 104 may be viewed as a single scatter or scatterer (e.g., causes a single scatter) at the times (as opposed to a multi-point scatter or scatterer at closer distances). That is, the host vehicle 102 may only receive a single return or single discernable scatter from the target 104 at each of the times. For example, radar return 110-1 may come from portion 112-1 at a first time, radar return 110-2 may come from portion 112-2 at a second time, radar return 110-3 may come from portion 112-3 at a third time, and radar return 110-4 may come from portion 112-4 at a fourth time. The portions 112 illustrated in FIGS. 1-3 are illustrated as similar portions of the target 104 for illustration and/or comparison purposes only.

The detections 108 are illustrated as locations or positions derived from ranges and angles computed from the radar returns 110. The location or positions of the detections 108 may be presented in a two-dimensional space 114 (e.g., Cartesian coordinates) relative to the host vehicle 102. In some cases, the detections 108 may be received in other coordinates and converted (e.g., they may be received in polar coordinates and converted to Cartesian coordinates). In the two-dimensional space 114, it can be seen that the positions of the detections 108 differ between the times (e.g., due to the velocity 106 and/or locations of the portions 112 of the target 104). The positional differences have components in each direction (e.g., x components 116 and y components 118). The difference between the positions of detections 108-2 and 108-1 are x component 116-1 and y component 118-1. The difference between the positions of detections 108-3 and 108-2 are x component 116-2 and y component 118-2. The difference between the positions of detections 108-4 and 108-3 are x component 116-3 and y component 118-3.

Figure 4:
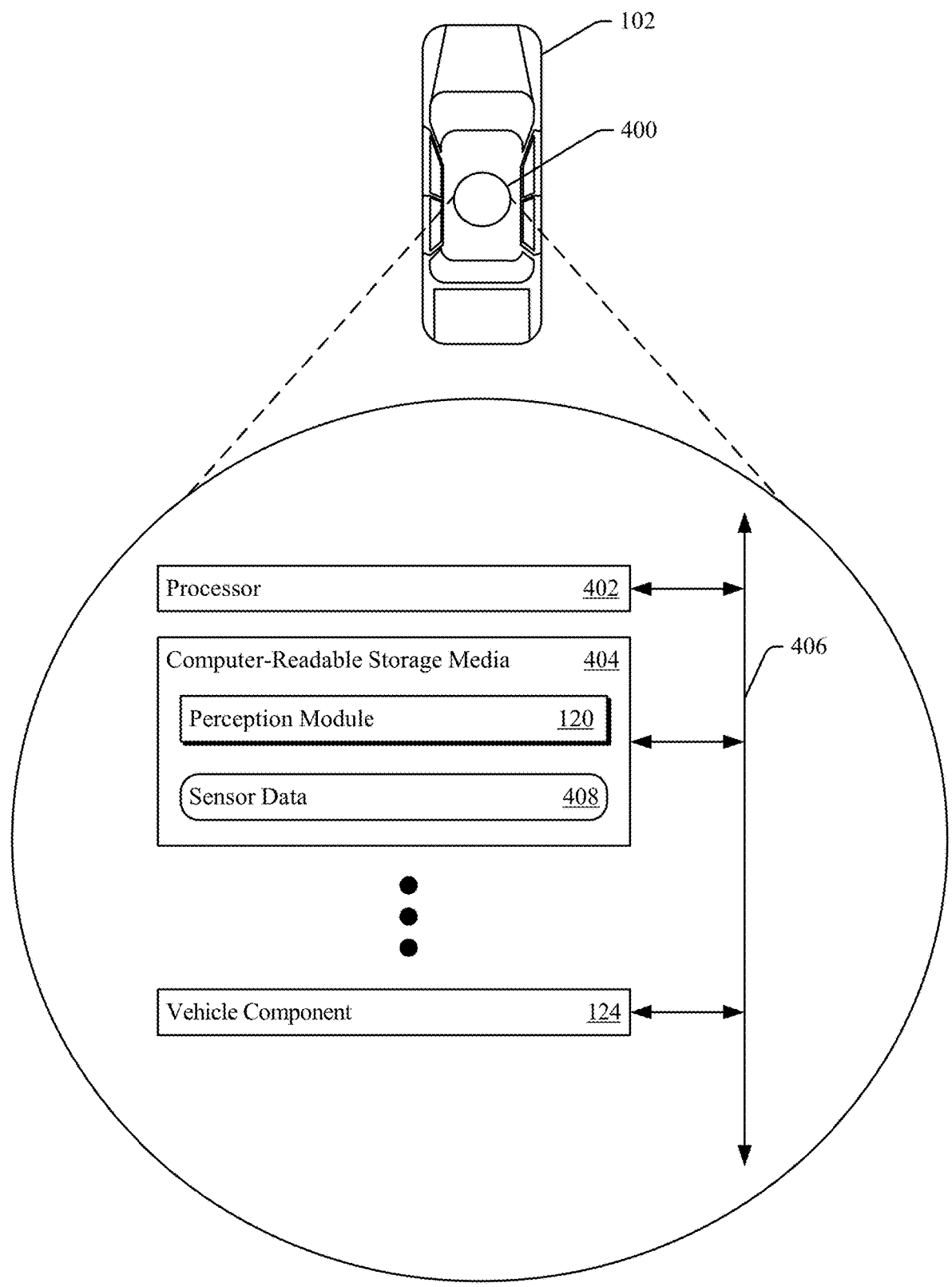
FIG. 4 illustrates an example system of a host vehicle configured to implement target-velocity estimation using position variance, in accordance with techniques of this disclosure.

A perception module 120, that is implemented at least partially in hardware as discussed further in regard to FIG. 4, calculates variances of the positions. That is, variances between the x components 116 and they components 118 (e.g., how close they are to each other) can be used to weight components of the respective x or y directions to calculate an estimated velocity 122 of the target 104. The estimated velocity 122 comprises a vector including magnitude (e.g., speed) and direction (e.g., has x and y components). The perception module 120 outputs the estimated velocity 122 for receipt by a vehicle component 124. The vehicle component 124 may be any downstream operation, component, or system that is able to utilize the estimated velocity 122 of the target 104 to perform a function (e.g., alter an operation of the host vehicle 102).

In the example environment 100, it can be seen that the variance of the x components 116 is low (e.g., 116-1, 116-2, and 116-3 are similar) while the variance of the y components 118 is high (e.g., 118-1, 118-2, and 118-3 vary widely). In this situation, the perception module 120 will weigh the x direction more heavily than the y direction. Doing so leads to a more vertical (e.g., higher weight in the y-direction) estimated velocity 122, which is what one would expect based on the velocity 106 in the example environment 100.

In the example environment 200, it can be seen that the variance of the x components 116 is high (e.g., 116-1, 116-2, and 116-3 vary widely) while the variance of the y components 118 is low (e.g., 118-1, 118-2, and 118-3 are similar). In this situation, the perception module 120 will weigh the y direction more heavily than the x direction. Doing so leads to a more horizontal estimated velocity 122 (e.g., higher weight in the x-direction), which is what one would expect based on the velocity 106 in the example environment 200.

In the example environment 300, it can be seen that the variance of the x components 116 they components 118 are both high. In this situation, the perception module 120 will weigh the x and y directions more equally. Doing so leads to a slanted estimated velocity 122 (e.g., no large difference in weighting between the x and y directions), which is what one would expect based on the velocity 106 in the example environment 300.

It should be noted that the example environments 100, 200, and 300 are merely example environments of using similar techniques. By weighting components used to calculate the estimated velocity 122 based on position variance (e.g., the variance of the x components 116 and they components 118), the techniques described herein enable the perception module 120 to calculate the estimated velocity 122 more accurately and with improved latency. In doing so, downstream operations may have increased effectiveness by getting an accurate estimated velocity 122 sooner than conventional techniques, which often fail to accurately compensate for ambiguity between spatial differentiation in single-point scatters and target movement.

Example System Configuration

FIG. 4 illustrates an example system 400 configured to be disposed in the host vehicle 102 and configured to implement target-velocity estimation using position variance. Components of the example system 400 may be arranged anywhere within or on the host vehicle 102. The example system 400 may include at least one processor 202, computer-readable storage media 404 (e.g., media, medium, mediums), and the vehicle component 124. The components are operatively and/or communicatively coupled via a link 406.

The processor 402 (e.g., application processor, microprocessor, digital-signal processor (DSP), controller) is coupled to the computer-readable storage media 404 via link 406 and executes instructions (e.g., code) stored within the computer-readable storage media 404 (e.g., non-transitory storage device such as a hard drive, solid-state drive (SSD), flash memory, read-only memory (ROM)) to implement or otherwise cause the perception module 120 (or a portion thereof) to perform the techniques described herein. Although shown as being within the computer-readable storage media 404, the perception module 120 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 402 and the computer-readable storage media 404 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 404 also contains sensor data 408 generated by one or more sensors (not shown) that may be local or remote to the system 400. The sensor data 408 indicates or otherwise enables the determination of information usable to perform the techniques described herein. For example, a sensor (e.g., radar sensor, sonar sensor, lidar sensor) may generate sensor data 408 corresponding to the detections 108.

The vehicle component 124 contains one or more systems or components that are communicatively coupled to the perception module 120 and configured to utilize the estimated velocity 122 for downstream processes. For example, the vehicle component 124 may comprise one or more of a cruise-control module, a semi-autonomous or autonomous driving module, a parking module, a traffic alert module, or any other module that affects one or more vehicle operations. The vehicle component 124 may affect respective dynamics of the host vehicle 102 (e.g., speed, acceleration, heading, vehicle configuration, vehicle operation or function). The vehicle component 124 is communicatively coupled to the perception module 120 via the link 406.

By using the example system 400, the host vehicle 102 may generate a more accurate estimated velocity 122 at a sooner time than traditional techniques. A more accurate estimated velocity 122 generated at a sooner time (e.g., when the target 104 is further away) enables better functionality of the vehicle component 124. In doing so, the vehicle component 124 may provide better safety and/or experience for occupants of the host vehicle 102, the target 104, and/or other vehicles or pedestrians.

Example Execution Path

Figure 5:
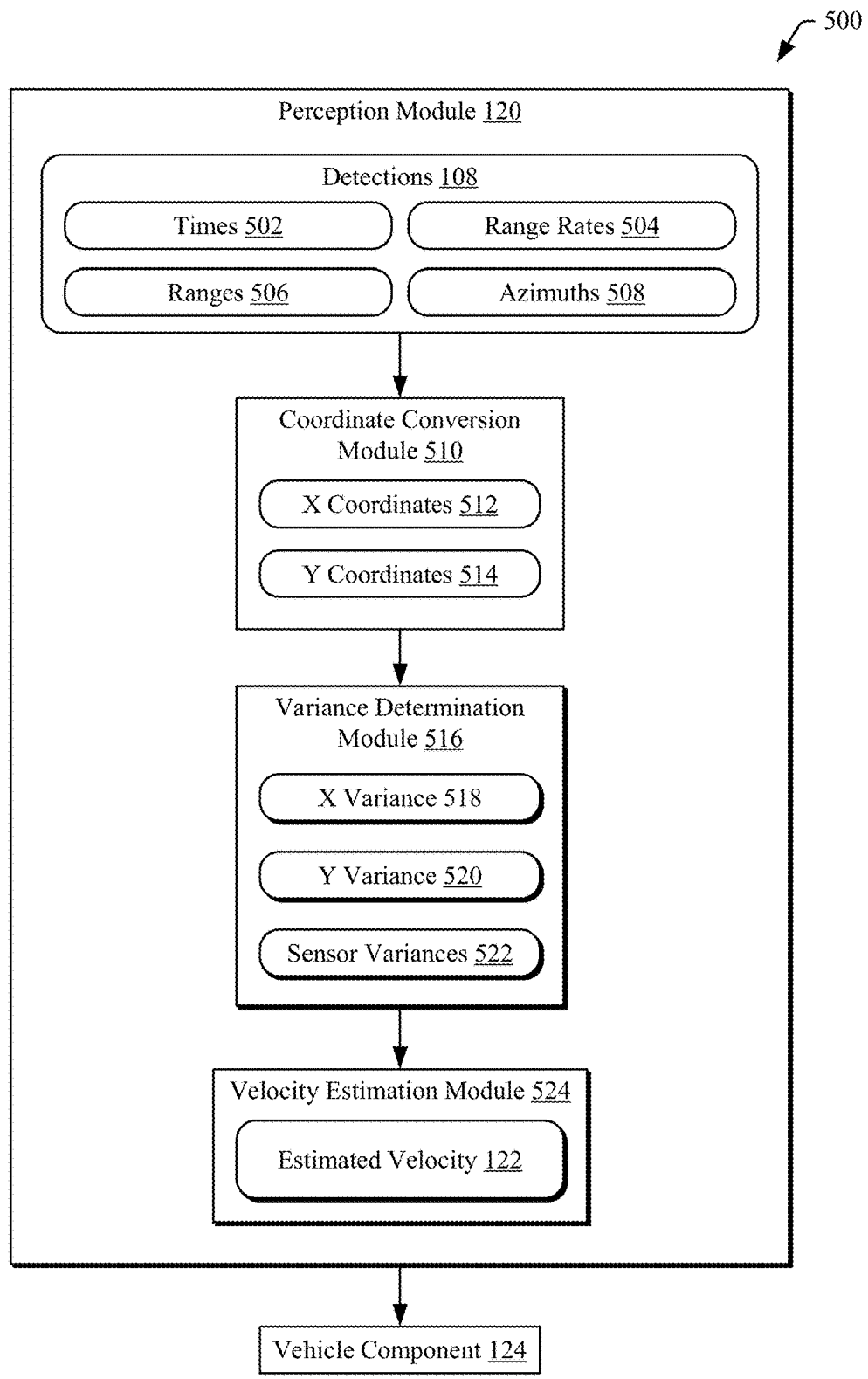
FIG. 5 illustrates an example execution path for target-velocity estimation using position variance, in accordance with techniques of this disclosure.

FIG. 5 is an example execution path 500 of target-velocity estimation using position variance. The example execution path 500 is generally implemented by the perception module 120, which may be implemented by the processor 402.

The execution path 500 starts with the detections 108 of the target 104 being obtained by the perception module 120. As shown, the detections 108 include times 502, range rates 504, ranges 506, and azimuths 508 of the target 104. Any number of detections 108 of the target 104 may be obtained. Generally, at least four detections 108 are obtained in order to calculate variances between the positions. The detections 108 may be acquired, received, or determined by the perception module 120 in any way known by those of ordinary skill in the art. For example, the perception module 120 may determine the detections 108 directly from the sensor data 408, from a bus or interface connected to sensors that interface with the example system 400, or from another module or system of the example system 400 (e.g., a radar module). Regardless of how or where the detections 108 are gathered, received, derived, or calculated, the perception module 120 is configured to use the detections 108 to determine the estimated velocity 122.

In furtherance of the example execution path 500, the detections 108 are input into a coordinate conversion module 510 of the perception module 120. The coordinate conversion module 510 is configured to determine positions of the detections 108 relative to the host vehicle 102 in two dimensions. For example, the coordinate conversion module 510 may take the respective ranges 506 and respective azimuths 508 and determine x coordinates 512 and y coordinates 514 according to Equations 1.

$$x_t = r_t \times \cos \theta_t$$

$$y_t = r_t \times \sin \theta_t \quad (1)$$

In Equations 1, $x_t$ is the respective x coordinate 512, $y_t$ is the respective y coordinate 514, $r_t$ is the respective range 506, and $\theta_t$ is the respective azimuth 508. The coordinate conversion module 510 may, in some implementations, be separate from the perception module 120. For example, a radar module may convert the ranges 506 and azimuths 508 into the x coordinates 512 and the y coordinates 514 and provide them to the perception module 120.

The x coordinates 512 and the y coordinates 514 are received by a variance determination module 516 that is configured to calculate variances in differences in the x coordinates 512 and the y coordinates 514. The variances may comprise an x variance 518 and a y variance 520. The variances may also be based on a function of sensor variances 522 that are unique to a sensor used for the detections 108. For example, the sensor variances 522 may contain range, range rate, and azimuth variances. The x variance 518 and the y variance 520 may be calculated according to Equations 2.

$$\text{var}_x = f(\text{var}_r, \text{var}_\theta) \times \text{var}\left[\frac{x_{t2} - x_{t1}}{t_2 - t_1}, \frac{x_{t3} - x_{t2}}{t_3 - t_2}, \frac{x_{t4} - x_{t3}}{t_4 - t_3}\right] \quad (2)$$

$$\text{var}_y = f(\text{var}_y, \text{var}_\theta) \times \text{var}\left[\frac{y_{t2} - y_{t1}}{t_2 - t_1}, \frac{y_{t3} - y_{t2}}{t_3 - t_2}, \frac{y_{t4} - y_{t3}}{t_4 - t_3}\right]$$

In Equations 2, $\text{var}_x$ is the x variance 518, $\text{var}_y$ is the y variance 520, $x_t$ is an x coordinate 512 of a respective detection 108, $y_t$ is a y coordinate 514 of a respective detection 108, t is a time of a respective detection 108, $\text{var}_r$ is a sensor variance 522 in range, and $\text{var}_\theta$ is a sensor variance 522 in azimuth. It should be noted that the differences in the coordinates correspond to the x components 116 and y components 118 of FIG. 1. In other words, Equations 2 determine variances in the differences in positions normalized by time differences between the detections. Essentially, the x variance 518 and the y variance 520 are variances in apparent x and y velocities of the target 104.

The x variance 518 and the y variance 520 are received by a velocity estimation module 524 that is configured to calculate the estimated velocity 122. The estimated velocity 122 may be calculated by solving Equation 3 for the estimated velocity 122 ([V]).

$$[A][V]=[B] \quad (3)$$

In Equation 3, $$[A] = \begin{bmatrix} \cos\theta_{t1} & \sin\theta_{t1} \\ \cos\theta_{t2} & \sin\theta_{t2} \\ \cos\theta_{t3} & \sin\theta_{t3} \\ \cos\theta_{t4} & \sin\theta_{t4} \\ t_2 - t_1 & 0 \\ 0 & t_2 - t_1 \\ t_3 - t_2 & 0 \\ 0 & t_3 - t_2 \\ t_4 - t_3 & 0 \\ 0 & t_4 - t_3 \end{bmatrix}, [V] = \begin{bmatrix} v_x \\ v_y \end{bmatrix}, \text{ and } [B] = \begin{bmatrix} rr_{t1} \\ rr_{t2} \\ rr_{t3} \\ rr_{t4} \\ x_{t2} - x_{t1} \\ y_{t2} - y_{t1} \\ x_{t3} - x_{t2} \\ y_{t3} - y_{t2} \\ x_{t4} - x_{t3} \\ y_{t4} - y_{t3} \end{bmatrix}.$$

$v_x$ is a component of the estimated velocity 122 in the x direction and $v_y$ is a component of the estimated velocity 122 in the y direction. rr is the range rate 504 of the respective detection 108. Because Equation 3 is overdetermined, it may be solved using a weighted linear least squares technique according to Equation 4.

$$[V] = ([A]^T[W][A])^{-1}[A]^T[W][B] \quad (4)$$

In Equation 4, $$[W] = \begin{bmatrix} \frac{1}{\text{var}_{rr}} & 0 & \cdots & \cdots & \cdots & \cdots & \cdots & \cdots & \cdots & 0 \\ 0 & \frac{1}{\text{var}_{rr}} & & & & & & & & \vdots \\ \vdots & & \frac{1}{\text{var}_{rr}} & & & & & & & \vdots \\ \vdots & & & \frac{1}{\text{var}_{rr}} & & & & & & \vdots \\ \vdots & & & & \frac{1}{\text{var}_x} & & & & & \vdots \\ \vdots & & & & & \frac{1}{\text{var}_y} & & & & \vdots \\ \vdots & & & & & & \frac{1}{\text{var}_x} & & & \vdots \\ \vdots & & & & & & & \frac{1}{\text{var}_y} & & \vdots \\ \vdots & & & & & & & & \frac{1}{\text{var}_x} & 0 \\ 0 & \cdots & \cdots & \cdots & \cdots & \cdots & \cdots & \cdots & 0 & \frac{1}{\text{var}_y} \end{bmatrix}$$

$\text{var}_x$ is the x variance 518 and $\text{var}_y$ is the y variance 520. $\text{var}_{rr}$ is a sensor variance 522 in range rate.

The output of the velocity estimation module 524 is a vector of the estimated velocity 122 with components in two directions (e.g., x and y). As such, the estimated velocity 122 has a direction and speed. The estimated velocity 122 is output for receipt by a downstream process or component, such as the vehicle component 124. As discussed above, the vehicle component 124 may use the estimated velocity 122 for one or more vehicle operations.

Although shown as being within the perception module 120, the variance determination module 516 and/or the velocity estimation module 524 may be separate from the perception module 120. For example, the variance determination module 516 and/or the velocity estimation module 524 may be a stand-alone component and/or executed via dedicated hardware. Furthermore, although described in terms of Cartesian coordinates, other coordinate systems may be used without departing from the scope of this disclosure.

By using the above techniques, the estimated velocity 122 of the target 104 may be calculated to account for spatial differences in single-point scatters of the target 104 by weighting perceived movements based on variances in the detected positions. In this way, the estimated velocity 122 may account for single-point detections of the target 104 that come from reflections that span a leading edge or face of the target 104. A more-accurate estimated velocity 122 leads to better performance of downstream operations, such as the vehicle component 124. The better performance allows for increased safety of passengers of the host vehicle 102, the target 104, and/or other people proximate to the host vehicle 102.

Example Process

Figure 6:
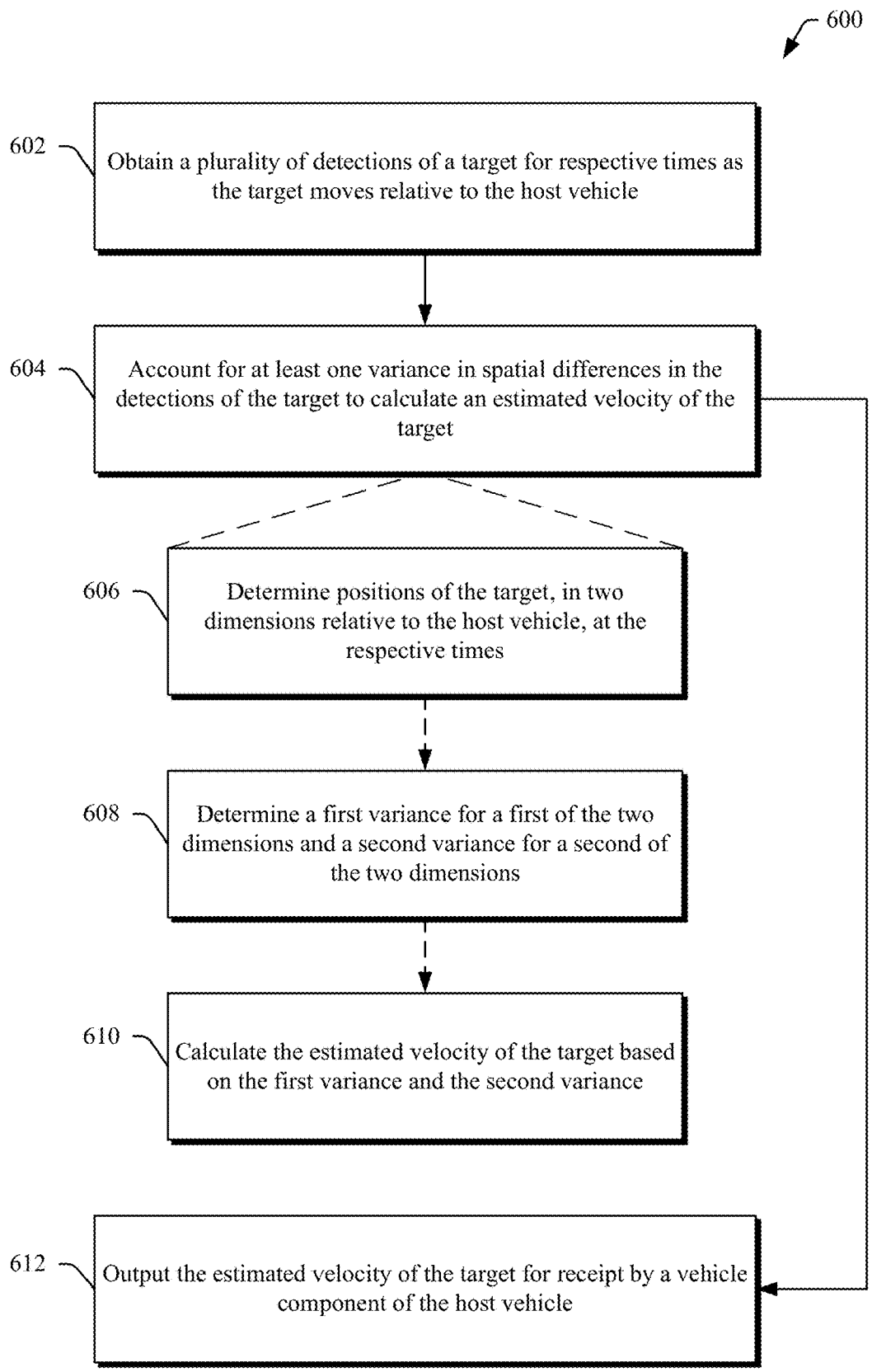
FIG. 6 illustrates an example process of target-velocity estimation using position variance, in accordance with techniques of this disclosure.

FIG. 6 is an example process 600 of target-velocity estimation using position variance. The example process 600 may be implemented in any of the previously described environments, by any of the previous systems or components, and utilizing any of the previously described techniques. For example, the example process 600 can be implemented in the example environments 100, 200, and 300, by the example system 400, and/or by following the execution path 500. The example process 600 may also be implemented in other environments, by other systems or components, and using other techniques. Operations 602 through 612 may be performed by one or more entities (e.g., portions of the example system 400, such as the perception module 120). The order in which the operations are shown and/or described is not intended to be construed as a limitation, and the order may be rearranged without departing from the scope of this disclosure. Furthermore, any number of the operations can be combined with any other number of the operations to implement the example method or an alternate method.

At 602, a plurality of detections of a target are obtained for respective times as the target moves relative to the host vehicle. For example, the perception module 120 may receive four or more detections 108 of the target 104.

At 604, at least one variance in spatial differences in the detections of the target is accounted for to calculate an estimated velocity of the target. For example, the perception module 120 may calculate the estimated velocity 122 using at least one of the x variance 518 or the y variance 520.

In order to do so, the example process 600 may perform steps 606 through 610. Steps 606 through 610 are optional and shown as an example of accounting for the variance in spatial differences in the detections of the target in the calculation of the estimated velocity.

At 606, positions of the target, in two dimensions relative to the host vehicle may be determined for the respective times based on the detections. For example, the coordinate conversion module 510 may determine the x coordinates 512 and the y coordinates 514 of the detections 108.

At 608, a first variance and a second variance may be determined for a first of the two dimensions and a second of the two dimensions, respectively. For example, the variance determination module 516 may determine the x variance 518 and the y variance 520.

At 610, the estimated velocity of the target may be calculated based on the first and second variances. For example, the velocity estimation module 524 may calculate the estimated velocity 122 based on the x variance 518 and they variance 520.

Whether or not steps 606 through 610 are performed, at 612, the estimated velocity of the target is output for receipt by a vehicle component of the host vehicle. For example, the perception module 120 may output the estimated velocity 122 for receipt by the vehicle component 124.

By calculating the estimated velocity 122 based on at least one variance in positions of the detections 108 of the target 104, the estimated velocity 122 may be determined accurately at a further distance (e.g., when the target 104 is a single scatter or scatterer). In doing so, a downstream vehicle operation does not have to wait to obtain an accurate estimated velocity 122. Providing the accurate estimated velocity 122 sooner enables the downstream vehicle operation to perform with better efficacy and safety.

Examples

Example 1: A method comprising: obtaining, by a system of a host vehicle, a plurality of detections of a target for respective times as the target moves relative to the host vehicle; accounting for at least one variance in spatial differences in the detections of the target to calculate an estimated velocity of the target; and responsive to accounting for the variance in the spatial differences in the detections of the target to calculate the estimated velocity of the target, outputting the estimated velocity of the target for receipt by a vehicle component of the host vehicle.

Example 2: The method of example 1, wherein the accounting for the variance in the spatial differences in the detections of the target to calculate an estimated velocity of the target comprises: determining, based on the detections, positions of the target, in two dimensions relative to the host vehicle, at the respective times; determining, based on the positions of the target at the different times, a first variance for a first of the two dimensions and a second variance for a second of the two dimensions; and calculating the estimated velocity of the target based on the first variance and the second variance.

Example 3: The method of example 2, wherein: the estimated velocity comprises a vector; and the calculating the estimated velocity of the target comprises calculating vector components of the estimated velocity of the target for the first of the two dimensions and the second of the two dimensions, respectively.

Example 4: The method of example 2 or 3, wherein: the two dimensions comprise Cartesian dimensions; and the determining the positions of the target comprises determining the Cartesian coordinates of the target at the respective times.

Example 5: The method of any of examples 2 to 4, wherein the calculating the estimated velocity of the target is based further on one or more sensor variances.

Example 6: The method of any of examples 2 to 6, wherein the calculating the estimated velocity of the target comprises applying a weighted linear least squares technique that applies the first variance to differences between the positions of the target in the first of the two dimensions and applies the second variance to differences between the positions of the target in the second of the two dimensions.

Example 7: The method of example 6, wherein the applying the weighted linear least squares technique comprises applying inverses of the first variance and the second variance to the differences between the positions of the target in the first of the two dimensions and the second of the two dimensions, respectively.

Example 8: The method of any of examples 1 to 7, wherein the host vehicle is stopped at the times.

Example 9: The method of any of examples 1 to 8, wherein: the detections are based on respective radar scatters received by the system of the host vehicle; and the radar scatters are single scatters from the target.

Example 10: The method of example 9, wherein at least two of the detections are based on radar scatters from different portions of the target.

Example 11: A system comprising: at least one processor; and computer-readable storage media comprising instructions that, when executed by the at least one processor, cause the system to: receive a plurality of detections of a target for respective different times as the target moves relative to a host vehicle; determine, based on the detections, positions of the target, in two dimensions relative to the host vehicle, at the respective different times; determine, based on the positions of the target at the respective different times: a first variance for a first of the two dimensions; and a second variance for a second of the two dimensions; calculate an estimated velocity of the target based on the first variance and the second variance to account for different portions of the target causing the respective detections; and output the estimated velocity of the target for receipt by a vehicle component of the host vehicle.

Example 12: The system of example 11, wherein: the estimated velocity of the target comprises a vector; and the calculation of the estimated velocity of the target comprises calculating vector components of the estimated velocity of the target for the first of the two dimensions and the second of the two dimensions, respectively.

Example 13: The system of example 11 or 12, wherein: the two dimensions comprise Cartesian dimensions; and the determination of the positions of the target comprises determining Cartesian coordinates of the target at the respective different times.

Example 14: The system of any of examples 11 to 13, wherein the calculation of the estimated velocity of the target is based further on one or more sensor variances.

Example 15: The system of any of examples 11 to 14, wherein the calculation of the estimated velocity of the target comprises applying a weighted linear least squares technique that applies the first variance to differences between the positions of the target in the first of the two dimensions and applies the second variance to differences between the positions of the target in the second of the two dimensions.

Example 16: The system of example 15, wherein the applying the first variance and the second variance comprises applying inverses of the first variance and the second variance to the positions of the target in the first of the two dimensions and the second of the two dimensions, respectively.

Example 17: The system of any of examples 11 to 16, wherein the host vehicle is stopped at the times.

Example 18: The system of any of examples 11 to 17, wherein: the detections are based on respective radar scatters received by the host vehicle; and the radar scatters are single scatters from the target.

Example 19: The system of example 18, wherein at least two of the detections are based on radar scatters from different portions of the target.

Example 20: Computer-readable storage media comprising instructions that, when executed by at least one processor, cause the at least one processor to: receive a plurality of detections of a target for respective different times as the target moves relative to a host vehicle; determine, based on the detections, positions of the target, in two dimensions relative to the host vehicle, at the respective different times; determine, based on the positions of the target at the respective different times: a first variance for a first of the two dimensions; and a second variance for a second of the two dimensions; calculate an estimated velocity of the target based on the first variance and the second variance to account for different portions of the target causing the respective detections; and output the estimated velocity of the target for receipt by a vehicle component of the host vehicle.

Example 21: A system comprising: a processor configured to perform the method of any of examples 1 to 10.

Example 22: Computer-readable storage media comprising instructions that, when executed by at least one processor, cause the processor or an associated system to perform the method of any of examples 1 to 10.

Example 23: A system comprising means for performing the method of any of examples 1 to 10.

Example 24: A method performed by the system of any of examples 11 to 19.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   obtaining, by a radar system of a host vehicle, a plurality of single-point detections of a target for respective times as the target moves relative to the host vehicle;
   determining, based on the single-point detections, positions of the target, in two dimensions relative to the host vehicle, at the respective times, the two dimension including a first dimension and a second dimension perpendicular to the first dimension;
   determining, based on the single-point radar detections, at each of the respective times, spatial variance in detections including a first variance amongst the positions of the target in the first dimension and a second variance amongst the positions of the target in the second dimension;
   calculating an estimated velocity of the target based on the first variance at each of the respective times and the second variance at each of the respective times; and
   outputting the estimated velocity of the target for receipt by a vehicle component of the host vehicle.

2. The method of claim 1, wherein:
   the estimated velocity comprises a vector; and
   the calculating the estimated velocity of the target comprises calculating vector components of the estimated velocity of the target for the first of the two dimensions and the second of the two dimensions, respectively.

3. The method of claim 1, wherein:
   the two dimensions comprise Cartesian dimensions; and
   the determining the positions of the target comprises determining Cartesian coordinates of the target at the respective times.

4. The method of claim 1, wherein the calculating the estimated velocity of the target is based further on one or more sensor variances.

5. The method of claim 1, wherein the calculating the estimated velocity of the target comprises applying a weighted linear least squares technique that applies the first variance to differences between the positions of the target in the first of the two dimensions and applies the second variance to differences between the positions of the target in the second of the two dimensions.

6. The method of claim 5, wherein the applying the weighted linear least squares technique comprises applying inverses of the first variance and the second variance to the differences between the positions of the target in the first of the two dimensions and the second of the two dimensions, respectively.

7. The method of claim 1, wherein the host vehicle is stopped at the times.

8. The method of claim 1, wherein:
the detections are based on respective radar scatters received by the radar system of the host vehicle; and
the radar scatters are single scatters from the target.

9. The method of claim 8, wherein at least two of the detections are based on radar scatters from different portions of the target.

10. The method of claim 1, wherein the calculating comprises:
weighing, at each of the respective times, components of the position in the first dimension and the second dimension based on the first variance at the respective times and the second variance at the respective times, respectively, such that as the first variance or the second variance increases a weight given to corresponding components of the position in the first dimension or the second dimension decreases.

11. A radar system comprising:
at least one processor; and
computer-readable storage media comprising instructions that, when executed by the at least one processor, cause the radar system to:
receive a plurality of detections of a target for respective different times as the target moves relative to a host vehicle;
determine, based on the detections, positions of the target, in two dimensions relative to the host vehicle, at the respective different times, the two dimension including a first dimension and a second dimension perpendicular to the first dimension;
determine, based on the single-point radar detections, at each of the respective times, spatial variance in detections including a first variance amongst the positions of the target in the first dimension and a second variance amongst the positions of the target in the second dimension;
calculate an estimated velocity of the target based on the first variance and the second variance at each of the respective times; and
output the estimated velocity of the target for receipt by a vehicle component of the host vehicle.

12. The radar system of claim 11, wherein:
the estimated velocity of the target comprises a vector; and
the calculation of the estimated velocity of the target comprises calculating vector components of the estimated velocity of the target for the first of the two dimensions and the second of the two dimensions, respectively.

13. The radar system of claim 11, wherein:
the two dimensions comprise Cartesian dimensions; and
the determination of the positions of the target comprises determining Cartesian coordinates of the target at the respective different times.

14. The radar system of claim 11, wherein the calculation of the estimated velocity of the target is based further on one or more sensor variances.

15. The radar system of claim 11, wherein the calculation of the estimated velocity of the target comprises applying a weighted linear least squares technique that applies the first variance to differences between the positions of the target in the first of the two dimensions and applies the second variance to differences between the positions of the target in the second of the two dimensions.

16. The radar system of claim 15, wherein the applying the first variance and the second variance comprises applying inverses of the first variance and the second variance to the positions of the target in the first of the two dimensions and the second of the two dimensions, respectively.

17. The radar system of claim 11, wherein the host vehicle is stopped at the times.

18. The radar system of claim 11, wherein:
the detections are based on respective radar scatters received by the host vehicle; and
the radar scatters are single scatters from the target.

19. The radar system of claim 18, wherein at least two of the detections are based on radar scatters from different portions of the target.

20. A non-transitory, computer-readable medium comprising instructions that, when executed by at least one processor, cause the at least one processor to:
receive a plurality of detections of a target for respective different times as the target moves relative to a host vehicle;
determine, based on the detections, positions of the target, in two dimensions relative to the host vehicle, at the respective different times, the two dimension including a first dimension and a second dimension perpendicular to the first dimension;
determine, based on the single-point radar detections, at each of the respective times, spatial variance in detections including a first variance amongst the positions of the target in the first dimension and a second variance amongst the positions of the target in the second dimension;
calculate an estimated velocity of the target based on the first variance and the second variance at each of the respective times; and
output the estimated velocity of the target for receipt by a vehicle component of the host vehicle.

* * * * *